United States Patent
Townsend et al.

(10) Patent No.: US 6,529,127 B2
(45) Date of Patent: *Mar. 4, 2003

(54) SYSTEM FOR REMOTE POWERING AND COMMUNICATION WITH A NETWORK OF ADDRESSABLE, MULTICHANNEL SENSING MODULES

(75) Inventors: Christopher Pruyn Townsend, Shelburne, VT (US); Steven Willard Arms, Williston, VT (US)

(73) Assignee: Microstrain, Inc., Williston, VT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/114,106

(22) Filed: Jul. 11, 1998

(65) Prior Publication Data

US 2002/0050925 A1 May 2, 2002

Related U.S. Application Data

(60) Provisional application No. 60/052,348, filed on Jul. 11, 1997.

(51) Int. Cl.[7] .......................... G08B 23/00; H04Q 5/22
(52) U.S. Cl. ................. 340/505; 340/572.4; 340/573.1; 340/5.61; 340/10.1; 340/10.5
(58) Field of Search .......................... 340/505, 825.54, 340/825.72, 538, 10.1, 10.2, 10.3, 10.4, 10.5, 5.61, 5.64, 572.1, 572.2, 572.4, 573.1

(56) References Cited

U.S. PATENT DOCUMENTS

| | | | | |
|---|---|---|---|---|
| 5,257,011 A | * | 10/1993 | Beigel | 340/825.54 |
| 5,422,636 A | * | 6/1995 | Urbas et al. | 340/825.54 |
| 5,440,300 A | * | 8/1995 | Spillman, Jr. | 340/825.54 |
| 5,469,142 A | * | 11/1995 | Bergman et al. | 340/572.2 |
| 5,532,686 A | * | 7/1996 | Urbas et al. | 340/825.54 |
| 5,602,744 A | * | 2/1997 | Meek et al. | 340/870.02 |
| 5,748,103 A | * | 5/1998 | Flach et al. | 340/870.11 |

* cited by examiner

Primary Examiner—Donnie L. Crosland
(74) Attorney, Agent, or Firm—Thomas N. Neiman; James M. Leas

(57) ABSTRACT

A multidrop network of multichannel, addressable sensing modules (ASM's), to be embedded within a composite structure, remotely powered, and interrogated by a personal computer through a non-contacting inductive link. Each ASM contains a microprocessor with non-volatile memory, multiplexer, programmable gain and filter instrumentation amplifier, and sigma delta analog to digital converter (all housed in two thin surface mount packages). An embedded mothernode includes circuitry for power and data reception (into the structure), and data transmission (back out of the structure). The external interrogation system communicates into the network of ASM's by modulating the AC waveform that delivers power to the embedded electronics. Once addressed, each ASM powers up its programmable (gain & filter) sensing channels (3 full differential or 5 pseudo differential) and data conversion elements. Sensed data are pulse code modulated, including error checking, which serially modulate an RF carrier for wireless transmission out of the composite to the interrogating computer. These advanced, micro-miniature sensing networks may be applied to a wide variety of military, medical, & civil structures.

51 Claims, 7 Drawing Sheets

SYSTEM FOR REMOTE POWERING AND COMMUNICATION WITH A NETWORK OF ADDRESSABLE, MULTICHANNEL SENSING MODULES

RELATED APPLICATIONS

This application is related to provisional patent application No. 60/052,348 filed Jul. 11, 1997.

BACKGROUND OF THE INVENTION

High performance materials such as graphite/epoxy composites allow the production of extremely strong, stiff, yet lightweight structures. However, there is a lack of data on their fatigue and failure modes, since these materials have not yet been in service long enough. This lack of statistical databases has limited their widespread acceptance. Furthermore, structures using these new composites tend to be over designed, which, in turn, may reduce or eliminate the benefits of using these materials. A related paper is by Spillman, W. B., Durkee, S.; *Non-Contact Interrogation System for Smart Structures*, Proceedings of SPIE vol. 2191, paper no.43, Proc. Smart Sensors, Processing and Instrumentation Session, North American.

Structural health monitoring would allow the realization of the materials full potential, since structures could be designed to their material limits. Embedded sensors could communicate information such as strain, stress, temperature, and pressure, to allow in service tracking of the materials behavior over time. Changes in behavior would indicate the need for service, repair, or replacement of component(s). This would increase our understanding of the characteristics of advanced materials, as well as improve our safety when these new structures are used in critical applications.

Recent efforts to produce structural monitoring systems have focused on integration of the sensors into the new materials. Related papers are in Proceedings of the 1st *European Conference on Smart Structures and Materials*, Glasgow, 1992 and SPIE Vol. 1798, *Proceedings of the Fiber Optic Smart Structures and Skins V Conference*, 1992. Embedded fiber optic sensors, capable of stress/strain measurements over large areas, have been developed, but the problem of connecting these fiber networks to an interrogation system still needs to be addressed. Machining and trimming of composite parts after initial fabrication can damage or destroy direct, contacting type connections to embedded sensors.

Prior patented art in the medical field includes that of Hogrefe et al. (U.S. Pat. No. 4,561,443; issued Dec. 31, 1985) which describes a coherent inductive communications link for biomedical applications. This two way inductive link provided communications between an external transceiver and an internal transceiver located in a biologically implantable medical device. Digitally formatted command data and programming data was transmitted to the implanted medical device by frequency shift keying in inductive communications link. The internal tranceiver was powered by the inductive field between the internal and external transceivers. Digitally formated data was transmitted to the external transceiver by internal transceiver amplitude modulating field. This patent describes means for communicating with an implanted (or embedded) device, but it does not describe means for conditioning or utilizing sensors or addressing sensor networks.

The development of improved implantable devices and materials requires knowledge of their in vivo behavior. However, little is known about the actual loads borne by implanted devices in vivo. Direct load measurement would provide extremely valuable information, for the improvement of device designs, and for the rapid rehabilitation of individuals in which devices have been implanted. Multichannel telemetry systems, combined with strain gauges, can provide this information.

Previous authors have developed and applied implantable telemetry for strain gauged implants. See Bergmann et al. *"Multichannel Strain Gauge Telemetry for Orthopedic Implants."* J. Biomech., Vol 21, No. 2, Pages 169–176, 1988 and Rohlmann et al., *"Telemeterized Load Measurement using Instrumented Spinal Internal Fixators in a Patient with Degenerative Instability"*, Spine, Vol 20, No 24, pages 2683–2689, 1995. However, these systems did not possess the capability of software programmability. By combining advanced, micropower, analog/digital integrated circuits (IC) with new, miniature, low power microprocessors, more versatile implantable telemetry systems can be realized, as described in C. P. Townsend and S. W. Arms, *"Multichannel, Programmable, Microprocessor Based Strain Gauge Telemetry System"*, Presented at 18th Ann. Int'l Conf. IEEE Eng. in Medicine & Biology Soc. Oct. 31–Nov. 3, 1996, Amsterdam, The Netherlands.

Prior patented art in the field of smart structures includes that of Spillman et al. (U.S. Pat. Nos. 5,440,300, 5,581,248, and 5,703,576). These patents describe a non-contact power and data interface for smart structures, an embeddable device for contactless interrogation of sensors, and an embeddable DC power supply for smart structure sensors. However, they also do not describe techniques for addressing networks of embedded, multichannel sensing nodes; this limits their utility when multiple sensors are required. These patents also do not make reference to the use of an embedded (remote) microprocessor, and do not use digital encoding methods for conversion of sensor signals and for data communications.

However, the use of a microprocessor provides distinct advantages, as it facilitates digital conversion and communications,and improves data fidelity. Furthermore, an embedded microprocessor can be used to send error checking information (checksum byte(s)) from the remote (or embedded) systems to the external interrogation unit. This allows the external unit to detect errors in (wireless) data transmission, and to "flag" those data that may have been altered by interference.

OBJECTS AND SUMMARY OF THE INVENTION

Development of non contact power/interrogation systems for use with embedded sensing networks would eliminate direct connections and solve the problems associated with them, as described in a paper by Townsend, C. P. and Arms, S. W., *"Method for Remote Powering and Communication with an Embedded Network of Addressable Sensing Modules"*, SPIE's 4th Annual Symposium on Smart Structures and Materials, Mar. 3–6, 1997, San Diego, Calif.

Smart structures should not be limited to specific sensing means, such as fiber optic type, since other sensing technologies can provide very useful information. Examples of these include: foil and piezo-resistive strain gauges, inductive & capacitive sensors, temperature probes, accelerometers, inclinometers, and magnetometers. Recent advances in transducer signal conditioners have produced very small, fully integrated, linear circuits for use with many of these devices. Related information is in Analog Devices, *Monolithic Instrumentation Amplifier*, part no. AD620, Amplifier reference manual, Norwood, Mass., 1992, Linear Technologies, *Precision, Micropower, Instrumentation Amplifier*, part no. LT1101, Linear Databook, Milipitas, Calif., 1990, and Analog Devices, *LVDT Signal Conditioner*, part nos. AD598 & AD698, Special Linear Reference Manual, section 10–23, Norwood, Mass., 1992. Intelligent, addressable sensing modules, with built-in signal conditioning and data transmission capabilities, are needed to provide data in a common (digital) format. These modules can then be used to create generalized sensing networks.

It is the object of this invention to teach a remote powering and communications method, combined with multichannel, microprocessor based sensing modules, especially for use with advanced sensate medical implants. It is further the object of this invention to describe the combination of embedded microproccessors, highly integrated sensor signal conditioners, digital data converters, and the use of networking techniques, especially for smart structure applications, in order to overcome the limitations of previous non contacting power links and analog data transmission systems.

It is the object of this invention to teach a multidrop network of multichannel, addressable sensing modules (ASM's), to be embedded within a composite structure, remotely powered, and interrogated by a personal computer through a non-contacting inductive link. Each ASM contains a microprocessor with non-volatile memory, multiplexer, programmable gain and filter instrumentation amplifier, and sigma delta analog to digital converter (all housed in two thin surface mount packages). An embedded mothernode includes circuitry for power and data reception (into the structure), and data transmission (back out of the structure).

It is the object of this invention to teach an external interrogation system which communicates into the network of ASM's by modulating the AC waveform that delivers power to the embedded electronics. Once addressed, each ASM powers up its programmable (gain & filter) sensing channels (3 full differential or 5 pseudo differential). and data conversion elements. Sensed data are pulse code modulated, including error checking, which serially modulate an RF carrier for wireless transmission out of the composite to the interrogating computer.

These networks will allow smart structures to be designed with a broad variety of capabilities. For example, temperature and strain information would be very useful during composite materials fabrication process. Exposure to cyclic strain, stress, pressure, electromagnetic fields, or radiation could be of interest in service. An open network architecture permits the addition or subtraction of various sensing modules, in order to best meet the requirements of a specific application. This capability can provide low cost structural health monitoring, as well as security, intelligence gathering, and control functions to be implemented as needed.

BRIEF DESCRIPTION OF THE PREFERRED EMBODIMENTS

DESCRIPTION OF THE PREFERRED EMBODIMENTS

Figure 1:
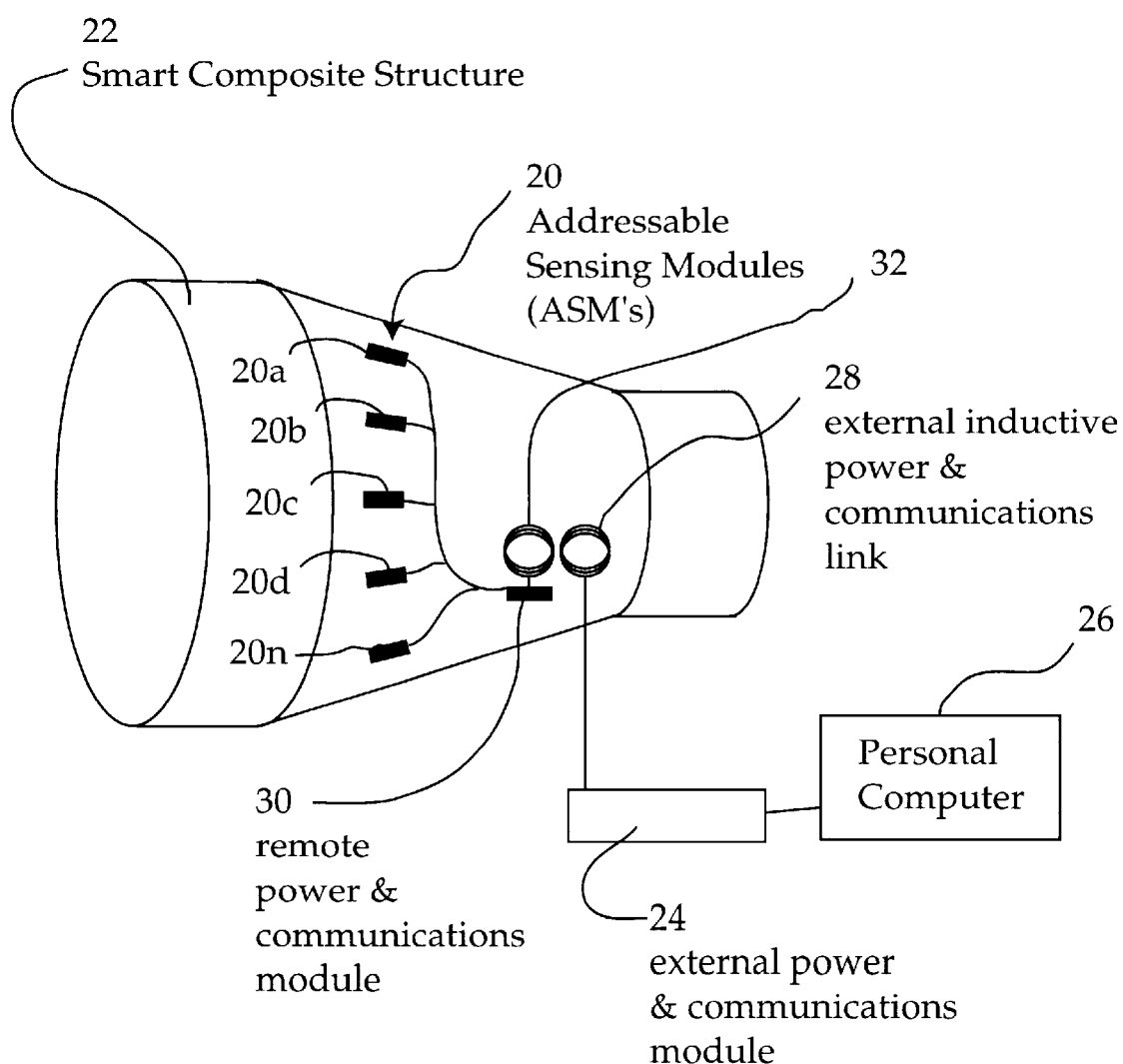
FIG. 1 illustrates the concept of the present invention for remote interrogation and activation of embedded sensing networks.

FIG. 1 is a graphic of the overall system concept, showing multidrop network of multichannel, addressable sensing modules (ASM's) 20, to be embedded within composite structure 22, remotely powered through external power and communications module 24 and interrogated by personal computer 26 through non-contacting inductive power and communications link 28. The embedded mother node or central control unit 30 includes embedded power and communications circuitry for power and data reception into ASM network 20 within composite structure 22 and data transmission back out of composite structure 22. Remote (embedded) coil 32 receives energy by tuned inductive coupling; that is, the external powering system 24 automatically adjusts its excitation frequency to match the resonant frequency of the embedded coil/capacitor network 34 (FIG. 2) that includes coil 32 and capacitor 36. This is important in order to insure efficient power transfer to embedded modules, as variations in the embedded components values (due to manufacturing tolerances, time, and temperature) may shift the embedded systems' resonant frequency.

Figure 2:
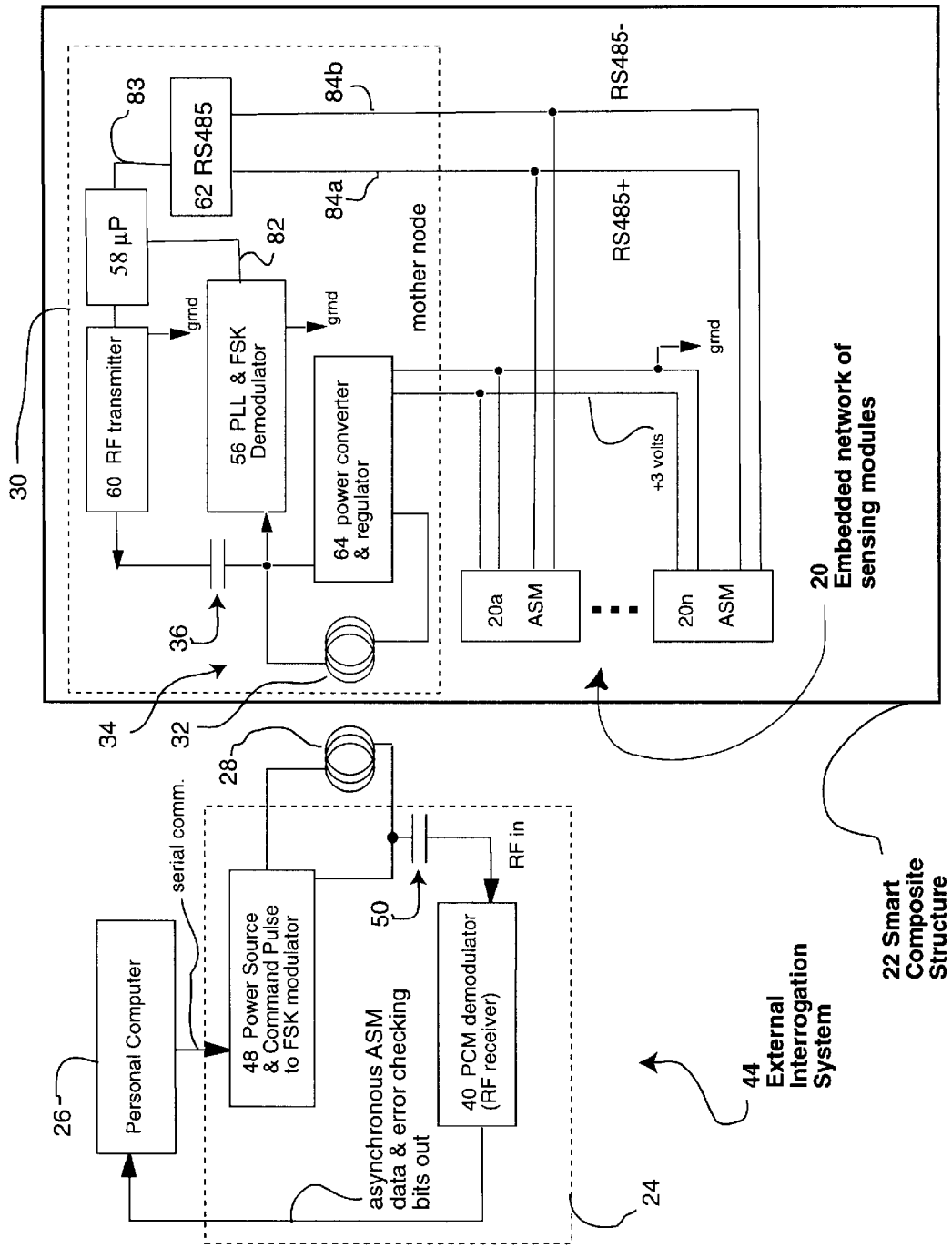
FIG. 2 is a block diagram of non-contact power/communication with embedded sensors.

FIG. 2 is the system's functional block diagram, including composite structure 22 and external interrogation system 44. External interrogation system 44 includes external power and communications link 28, external power and communications module 24, and personal computer 26. External power and communications module 24 includes PCM demodulator for RF reception 40, power source with command pulse for frequency shift keyed modulation (FSK) 48, and capacitor 50. Connections among these components will be described herein below.

Composite structure 22 includes coil-capacitor network 34, mother node or central control unit 30, and network of ASMs 20. Mother node or central control unit 30 includes phase locked loop (PLL) 56 for FSK demodulation, microprocessor 58, RF transmitter 60, RS485 communications circuit 62, and power converter and regulator 64. Connections among these components will be described herein below.

Figure 4:
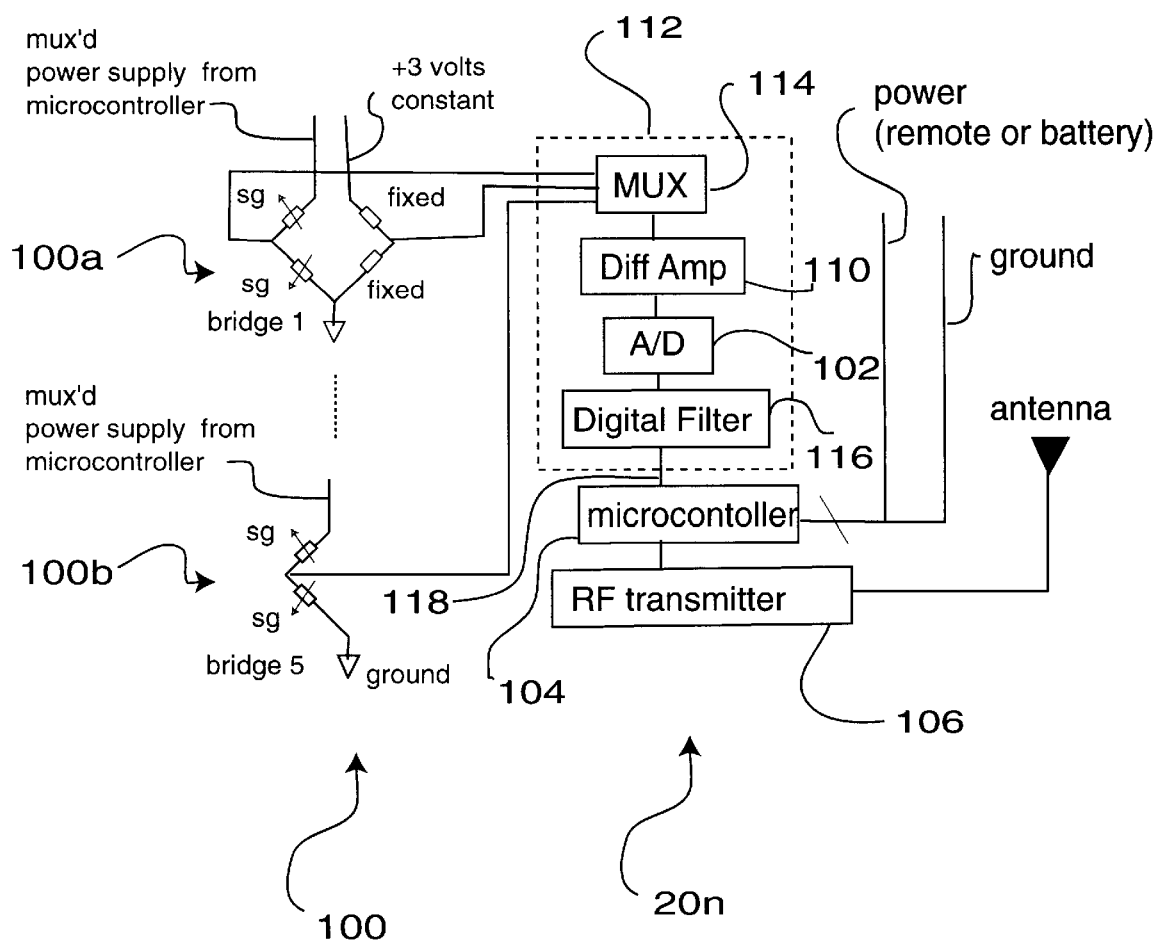
FIG. 4 illustrates a single node ASM.
Figure 5:
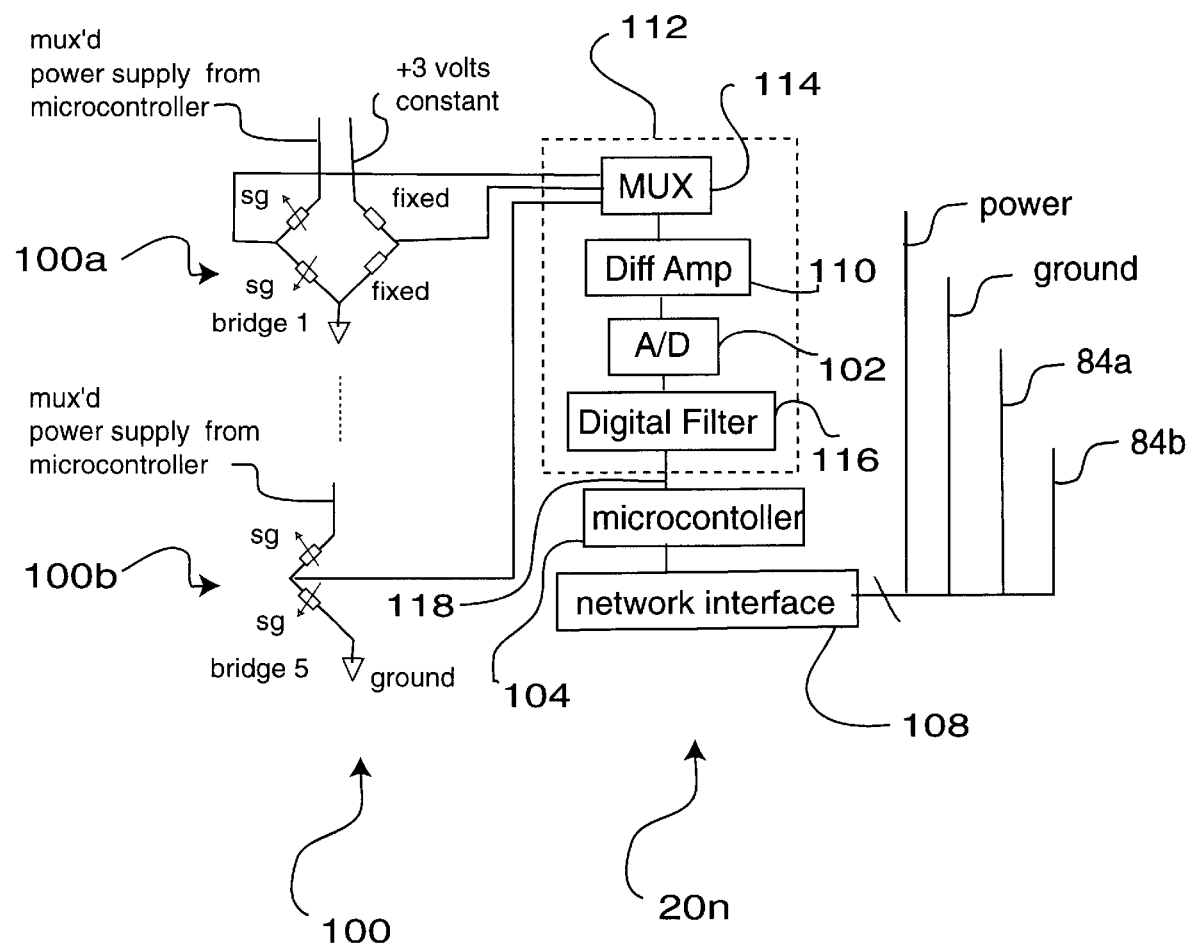
FIG. 5 illustrates a networked ASM.

The ASM block diagrams for multidrop networks and single nodes are provided in FIGS. 4 & 5.

Remotely Powering the Embedded ASM Networks

Figure 3:
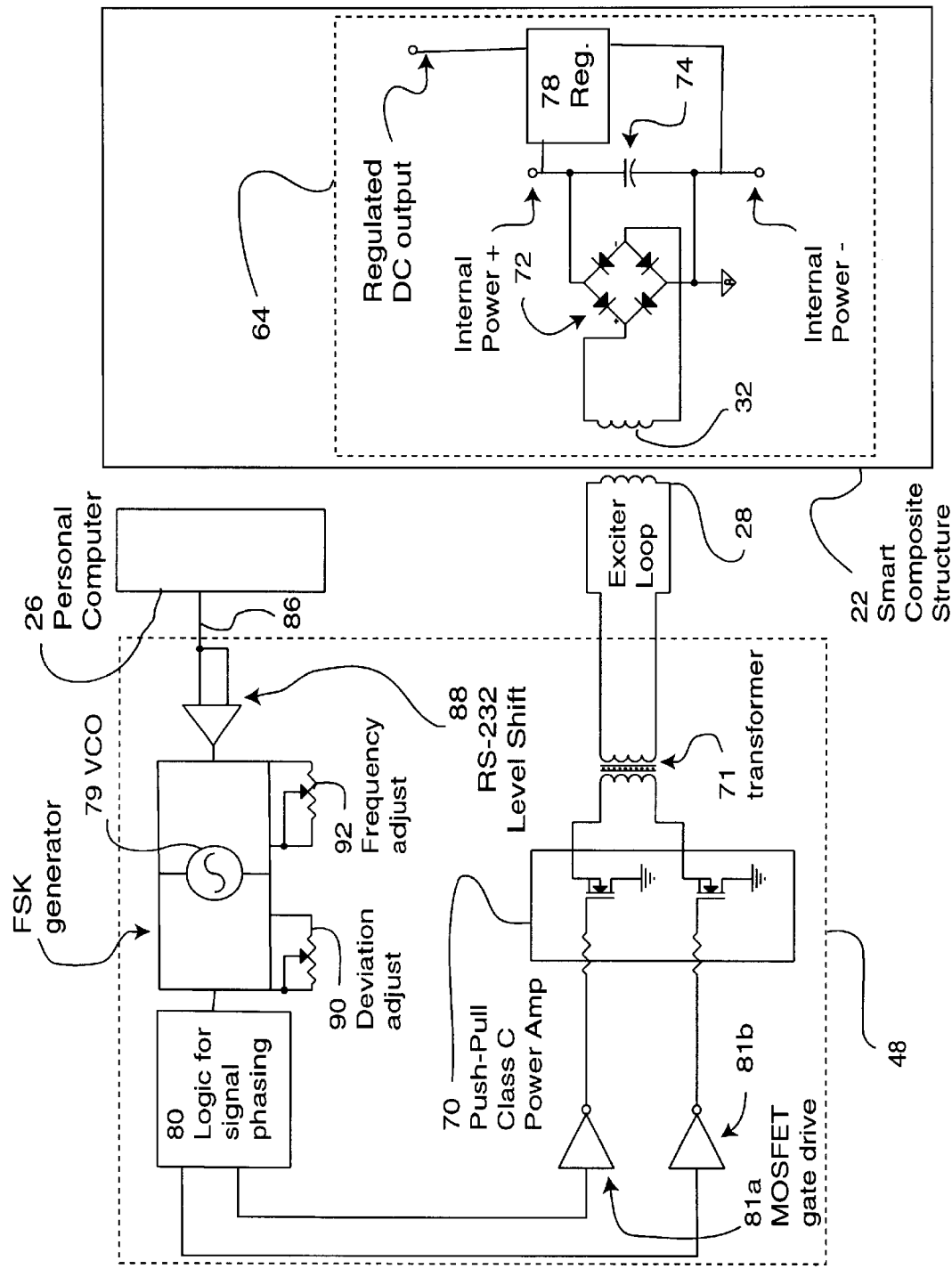
FIG. 3 is a block diagram of a remote power system of the present invention.

FIG. 3 is a block diagram showing how remote power is provided by power source with command pulse for frequency shift keyed modulation (FSK) 48, personal computer 26, and exciter loop coil 28 to embedded (receive) coil 32. Power amplifier 70, capable of delivering sufficient power to external exciter coils 28 is employed to generate a magnetic field (not shown) which penetrates the structure under test; this field is received by embedded coil 32, which in turn is used to power the embedded electronics 20, 30 within composite structure 22.

For our tests with 10 mm thick fiberglass/graphite/epoxy composite, we found that a minimum of 5 Watts was required from the external power amplifier 70 in order to achieve good performance. This power may vary greatly depending on a variety of factors, including the type of material under test, the spacing between exciter coil 28 and receiver coil 32, and the relative alignment of the exciter coil 28 and receiver coil 32. The exciter coil 28 used in our tests was 3.5 turns 1 inch diameter of #16 A.W.G. magnet wire.

It was driven by a 10 turn secondary winding on the output transformer 71. The exciter coil 28 was wound on one half of a Ferroxcube pot core of 4C4 material. This ferrite material has a high saturation flux density up through 30 MHz; this material raises the impedance of the exciter coil 28, and reduces the drive current relative to an air core exciter coil.

The receiver coil 32 was a printed circuit coil design with 10 turns, 1.062 inch diameter, embedded in polyimide "flex-strip" material. This coil was used along with a bridge of 1N914 diodes 72 and a 2.5 uF filter cap 74 to form a DC power supply 64 (with a regulator 78, as shown in FIGS. 2 and 3) to power the embedded electronics. The 10 mm conductive graphite composite material was used as the test sample that the powering system was designed around, as this composite provide the greatest challenge for efficient power transfer. Through this material we were able to deliver 3.2 volts DC to a 100 Ohm load (or 96 mW of power). This allows us maximum of 32 mA of excitation current for the design of the embedded system. This exceeded our target specification of 25 mA at 3.0 V DC (75 mW) through air. We have demonstrated that we can deliver more power when the material is non-conductive. When the receiver coil 32 was spaced 10 mm from the exciter coil 28 and the transmission medium was air, we were able to couple in 180 mW of power to the embedded system.

Power supply 64 includes a rectifier, which includes diode bridge 72 and capacitor 74, and regulator 78. Power supply 64 converts the AC energy from embedded loop 32 into 3 volts DC, which is used to power up the phase locked loop (PLL) 56, AD7714 which is a component of each ASM 20, PIC16C microprocessor 58, 104, and RF SAW oscillator, transmitter 60. The PLL (and integrated VCO) is phase locked to the incoming signal, and the PLL error voltage shifts in amplitude in accordance with the frequency shift modulation. The error voltage represents the conversion of incoming FSK signals into a serial data stream for direct communication to the embedded micro controller or microprocessor 58.

Communications into the Composite Structure

To minimize component number and system complexity, it is advantageous to use the voltage controlled oscillator (VCO) 79 of external power supply module 48 in order to communicate command signals from external interrogation system 44 to embedded sensor network 22. In the preferred embodiment, command signals from the interrogating personal computer 26 (PC) modulate the low frequency power oscillator VCO 79 using frequency shift keying (FSK), to transmit command information through the inductive power/communication link, exciter loop 28. This modulation is achieved by applying the command data to VCO 79. The center frequency of VCO 79 is chosen to match the optimum frequency of embedded coil/capacitor network 34 as determined by testing of the composite structure 22. The output of this voltage controlled oscillator 79 is used to control the input of power amplifier 70. The output of VCO 79 drives logic for signal phasing 80 and high capacity MOSFET gates 81a, 81b which in turn control power amplifier 70. Power amplifier 70 then drives exciter coil 28 at the required levels to achieve adequate power to embedded coil 32.

Command signals begin with a data request from personal computer 26 and move through external coil 28 to be received by embedded coil 32. Embedded coil 32 is connected to phase-locked loop (PLL) FSK decoder 56 (FIG. 2). FSK decoder 56 recovers the command signals and communicates them over command data line 82 to microprocessor 58. Data line 83 provides signals to RS485 communications module 62, which in turn is connected to ASM network 20 through differential RS485 lines 84a, 84b. This allows a specifically addressed ASM 20a, 20b, 20c in embedded network 20 to be controlled. The command signals will be received by each ASM 20a, 20b, 20c in the embedded network 20, but only the specifically addressed ASM 20n will respond by sending its data. This method will insure that the network of ASMs will not interfere with one another, since only one ASM will transmit its data at a time.

Figure 6:
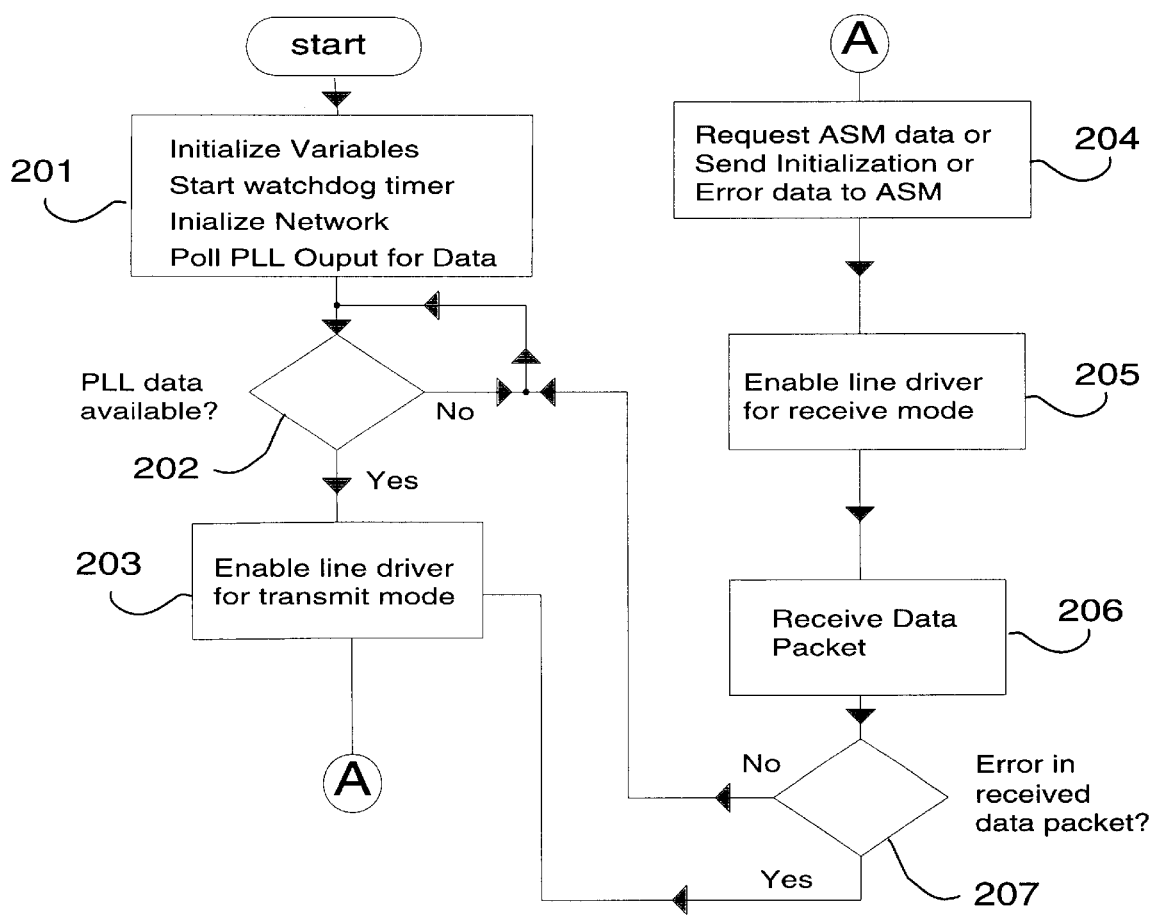
FIG. 6 is a software flowchart for a networked mother node.

This flow is described in FIG. 6. To start, variables are initialized, watchdog timer is started, network is initialized, and the output of PLL and FSK demodulator 56 is polled for data, as shown in box 201. The polling is shown in decision box 202. If data is available at PLL and FSK demodulator 56 then RS485 communications circuit 62 is enabled to transmit data, as shown in box 203. Microprocessor 58 requests data from any ASM 20a, 20b, . . . 20n or sends initialization or error data to the ASMs based on the received data in PLL and FSK demodulator 56, as shown in FIG. 2 and in box 204. After data is sent RS485 communications circuit 62 is enabled to receive data, as shown in box 205 and a data packet is received from an ASM, as shown in box 206. If there was an error in receiving the data packet then the system tries again by enabling and requesting again, as shown in decision box 207 which connects back to box 203. If no error was detected then PLL and FSK demodulator are checked for additional data, as shown in connection back to decision box 202. As further described herein below, received data packets are transmitted by transmitter 60 to external PCM demodulator for RF reception 40, as shown in FIG. 2. If PLL and FSK demodulator data is not available then the system loops on whether data is available until data becomes available, as further shown in decision box 202.

To test the FSK concept, and to send FSK data into smart composite structure 22, personal computer 26 was used to control the frequency of power supply module 48 and power amplifier 70. The frequency of power supply module 48 and power amplifier 70 was modulated by VCO 79 in proportion to the output of the computer's RS232 port 86 to level shifter 88. The frequency deviation of power supply module 48 was adjustable via potentiometer 90. The center frequency of power amplifier 70 was set by potentiometer 92 to 500 kHz with a deviation in frequency of +/−7% for a change in input bit level.

The demodulation system 56 consisted of a micropower phase locked loop (PLL) and six passive components. The system 56 is designed to lock on to the center frequency of 500 kHz and track this signal. An error signal proportional to the difference between the center frequency and the output is produced at the output of the phase locked loop circuit 56. This error output is fed to a voltage comparator that produces an output wave form on line 82 that is compatible with microprocessor 58. The data format transmitted through the link is in eight bit asynchronous serial data format (1 start bit, 8 data bits, 1 stop bit).

FSK data transmission possesses an advantage over amplitude shift keying (ASK) in that FSK modulation of the carrier does not significantly effect the power transfer. ASK will also be more sensitive to unintended changes in the magnitude of the power signal that may occur over the full temperature range in the presence of electrical noise, or coil misalignment. The FSK method is much more immune to error in all of the above environments, resulting in a more robust data transfer link. The FSK system also offers higher speed transfer capabilities at no cost in power transfer, so if increased sensor data bandwidth is required in the future, the FSK system will be capable of this.

Frequency shift keying (FSK) has been utilized for this application because it offers a robust method of data communication, and there are plenty of off-the-shelf components that support FSK generation and detection. Furthermore, the carrier remains active during modulation, which allows continuous power transfer during interrogation. This may be critical for embedded sensing systems that have several active integrated circuits.

The FSK demodulator 56 implementation is extremely small in size and component count. The supply current of the internal PLL based FSK system is only 510 microamps at 500 kHz input frequency. Based on the test results the FSK system was chosen as the communication link for communicating with the internal network. The system was tested for bit error rate at a baud rate of 2400 baud (bits per second) with the primary exciter coil 28 transmitting to the secondary embedded coil 32 through a 10 mm sample of conductive graphite composite. The bit error rate was determined to be $3.7 \times 10^{-8}$ error/bit (0.04 ppm).

This allows the user to interrogate micro controller 58, 104 (for information regarding previous tests or stored sensor data), or to reprogram sampling parameters, filter parameters, and analog gain on a channel-by-channel basis. In this way, optimization of data sampling from each channel may be performed to maximize resolution or bandwidth, as required by the application.

ASM (Both Single Node & Networked) Architecture

ASMs 20a, 20b, 20c are capable of being remotely addressed by personal computer 26 through the FSK communications scheme described earlier. Once activated, addressed ASM 20n will power sensing circuitry 100, read A/D converter 102, and send pulse code modulated (PCM) digital data out of microprocessor 104 to RF transmitter 106, as shown in FIGS. 4 and 5. It is important to note that single node (non-networked) ASM's may also be employed. The single node ASMs are similiar in topology to the networked versions, however, they do not require differential RS485 lines 84a, 84b. A block diagram of a wireless, single node ASM is provided in FIG. 4. This diagrams shows microcontroller 104 directly modulating RF transmitter 106. It also shows that power may be derived from a battery or received remotely through an embedded power supply 64 that is inductively coupled to an external interrogation system 44, as shown in FIG. 2. The main ASM circuit 20n was designed to provide high resolution measurement from any sensor 100 that can be incorporated into a DC Wheatstone full bridge or half bridge configuration, as shown in FIGS. 4 and 5. At the heart of ASM 20n is a tiny, 20 pin, small shrink outline package (SSOP), micropower, 8 bit microcontroller 104. This microcontroller 104 provides a high performance RISC based system in a microminiature low power package. The microcontroller 104 serves to read command data from the network interface 62 served by differential RS485 lines 84a, 84b, program and acquire data from the analog to digital converter 102, provide multiplexed power to sensor bridges 100, and transmit data back onto the network bus using differential RS485 lines 84a, 84b. The microcontroller interfaces to the network bus using a micropower half duplex CMOS RS485 line driver 108 (FIG. 5).

Microcontroller 104 reads data from differential RS485 lines 84a, 84b. If this data addresses a particular ASM, microcontroller 104 will switch power to strain gauge bridge 100a or 100b, signal conditioner differential amplifier 110, and A/D converter 102. Switching power is accomplished by utilization of one of the microcontroller's 104 digital output lines (not shown). These lines are capable of driving up to 25 milliamps of DC current, and may be programmed in order to switch the 3 volt supply from regulator 78 of embedded power supply 64 to strain gauge bridge 100a or 100b, signal conditioner differential amplifier 110, and A/D converter 102.

This is advantageous, since the individual bridge currents for bridges 100a, 100b can represent a significant current draw, especially when powered up simultaneously. By multiplexing power to the sensors synchronously with the analog to digital conversion, we deliver power to only one bridge 100a or 100b at a time. For five Wheatstone bridge circuits comprised of 1000 ohm strain gauges, we reduce the bridge current demand from 15 milliamps to 3 milliamps. Excitation may also be selectively applied to only the ASM node 20a, 20b, 20c that PC 26 requests data from. This selective excitation of ASMs and sensors connected to ASMs greatly reduces the total supply power used by the embedded system.

A single chip 112, such as AD7714, Analog Devices, Norwood, Mass. is used to interface the analog outputs of the sensing devices to microcontroller 104. The highly integrated AD7714 represents a single chip solution to strain gauge signal conditioning in an off-the-shelf, thin-shrink surface mount package. It contains multiplexer 114, precision programmable-gain instrumentation amplifier 110, programmable digital filter 116, 24 bit analog to digital (A/D) converter 102, and direct interface to the embedded micro controller 118. The AD7714 is capable of conditioning three full differential bridge type sensors for inputs or 5 pseudo-differential type sensors for inputs. The large dynamic range afforded by the 24 bit A/D converter 102 allows the use of bridge circuits with appreciable offsets, without requiring trimming networks or potentiometers. The architecture of the AD7714 also features the capability to remove offsets due to bridge unbalances, without sacrificing dynamic range of the A/D converter. This is accomplished through a one time calibration procedure, which we have implemented. This approach represents a significant reduction in size, complexity and cost.

Following powering on the specified sensor and after allowing sufficient time for the analog circuitry of the sensor and signal conditioner and differential amplifier 110 to settle, chip 112 will then perform an A/D conversion of the signal conditioner and differential amplifier's 110 output. A/D converter 102 will be referenced to the 3 volt supply line, which is also used to power the strain gauge Wheatstone bridge 100a or 100b. This technique provides ratiometric output from the A/D converter 102, which greatly reduces bridge measurement errors due to drift in the DC supply voltage.

After reading A/D converter 102, power is shut down to sensor bridge 110a or 100b that was powered on, conditioner 110, and A/D converter 102. Microcontroller 104 transmits the reading, along with a synch byte and checksum byte for error checking. These data bytes are sent through tri-state line driver and RS 485 network interface 108 in low impedance mode on to the ASM data line. ASM's that have not been addressed are isolated from the ASM data line because their line drivers have been placed in high impedance mode.

In the event an error is detected, personal computer 26 will re-address the ASM in order to try to obtain error free data; however, in the event of more than three unsuccessful attempts, the interrogation system will move on to request data from other ASMs 20a, 20b, 20c on the network. Once the ASM's microcontroller 104 has completed data transmission, microcontroller 104 then puts its tri-state line driver and RS 485 network interface 108 into high impedance mode. This allows other ASMs to communicate over the ASM differential RS485 lines 84a, 84b without loading their line drivers network interface 108, or damaging other ASMs. This hardware and software architecture facilitates the addition of ASMs into the network, which may be accomplished by simply tying each additional ASM to the network's four lines.

Data Communication from the Remote Network

Digital data is sent to micro controllers 58, 104 such as MicroChip Technology's PIC16C, Chandler, Ariz., which then modulates by ASK the high frequency RF surface acoustic wave SAW oscillator within RF transmitter 60, 106 for transmission out of smart composite structure 22. The SAW oscillator typically operates in the (narrow) band of 303.825 MHz, and is precisely matched to its companion receiver in its oscillation frequency. This insures "lock" of the received signal, since drift of the SAW oscillator transmitter/receiver pair over time and temperature is negligible. This also makes initial manufacture of the devices much simpler as no initial adjustments (tuning) of the transmitter or receiver are required. Data is directly modulated onto the carrier from microcontroller 58 using simple amplitude modulation of the RF signal.

External receiver PCM demodulator 40 utilizes a matched SAW resonator and a RS-232 level shifter to convert the digital data from receiver PCM demodulator 40 (0 to 3 volts) into levels that are compatible with the personal computer's 26 (+/−9 V) serial communications port.

Recent advances in wireless communications devices allows these systems to achieve high data transfer rates (9600 to 19,200 baud). We have found data reception to be extremely reliable over short distances (15 ft). The use of pulse code modulation (PCM) permits transmission of a checksum byte at the end of each data set (or full channel sweep); at the receiver PCM demodulator 40, this checksum is compared to the actual sum of the received bits in order to detect RF transmission errors.

The system was tested by transmitting known digital data along with a checksum byte, the received data was collected by computer PC 26, checked for an error by computing the checksum and saving this data to the disk drive of interrogating personal computer 26. To be representative of a typical composite materials application, the system was tested by transmitting data through a 10 mm carbon composite sample to receiver PCM demodulator 40. The duration of the test was 48 hours running continuously. The bit error rate was determined to be only $10 \times 10^{-6}$. Errors due to RF transmission are detected by the error checking routines so errors do not propagate into data collection.

Compatibility with Various Sensing Devices

Figure 7:
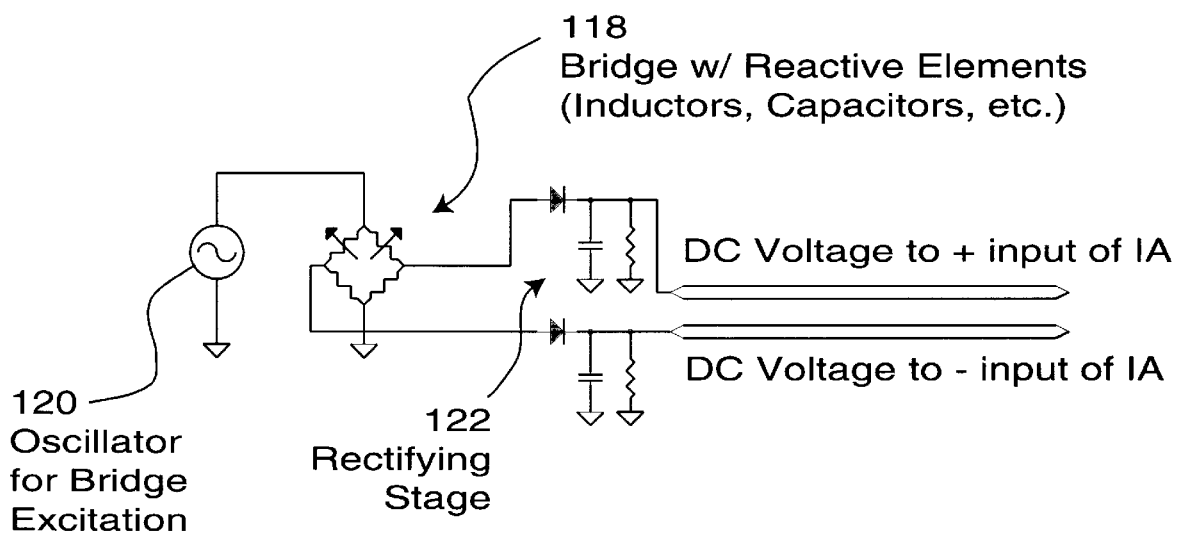
FIG. 7 is a block diagram of a reactive sensor node.

The system has been tested successfully with Wheatstone bridge sensors, including accelerometers, foil strain gauges, and strain gauge based force transducers. In addition, we have successfully tested ASM nodes with inductive displacement transducer 118, as shown in FIG. 7. Inductive displacement transducer 118 requires an AC excitation waveform generated by oscillator 120 (as opposed to the DC excitation which is required by other strain gauge bridges, as shown in FIGS. 4 and 5). The AC waveform is rectified using a simple peak detector 122 and the output of peak detector 122 is fed to differential instrumentation amplifier IA 110 on chip 112 for amplification and analog to digital conversion in A/D converter 102, as shown in FIGS. 4 and 5.

In the preferred ASM embodiment, the bridge signal conditioner and analog to digital converter are located adjacent to the sensing elements (strain gauges). Use of flexible, polyimide circuitry allows the sensing elements and ASM electronics to be fully integrated, since strain gauges and temperature sensors may be etched on to the polyimide during manufacture. Pads on the flexible circuitry would also allow the use of semiconductor strain gauges (or other DC bridge) devices. The close proximity of the sensing elements, signal conditioner, and A/D converter is advantageous, since this construction provides very low noise data for transmission onto the network.

Polyimide backed etched metal foil strain gauges are widely used for stress analysis and structural model verification. This basic construction is also used to create commercially available temperature sensors and crack propagation detectors. Their extremely thin profile, versatility, and low cost make them ideal for use in critical composite structures.

ASM's can measure the output of up to five Wheatstone bridge circuits. Each module is compatible with a wide variety of (DC) bridge type sensors, including: strain gauge rosettes, piezoresistive strain gauges, foil temperature sensors (thermocouples and resistance temperature detectors), magnetic field sensors, accelerometers, and pressure transducers.

This capability is generally useful, since it may be extended to provide the measurement of many physical quantities, such as: strain direction/magnitude, crack propagation, inclination/orientation, magnetic field intensity/direction, and temperature gradients. We have also demonstrated that sensors employing inductive or capacitive technologies may also be used with our ASM's (with modifications to the front-end active and passive components) to perform AC excitation/demodulation.

Accelerometers are widely used for structural testing and monitoring; they may be used to measure both acceleration and inclination (with respect to Earth's gravity vector). ASM's with on board frequency and amplitude detection capability have also been designed. This ASM may also be used in conjunction with sensors that are suited to measurement by frequency counting, such as: vibrating wire strain gauges, and resonant (capacitive and inductive tank oscillator) sensors.

Vibration monitoring nodes could perform the function of a miniature (and very elegant) frequency analyzer. By utilization of many of these nodes, placed strategically on or within a structure, engineers will gain valuable insight into the structure's vibratory response. This information is important for mathematical modeling of the structure's inherent stiffness.

Differential capacitive transducers possess several advantages over foil type resistance and piezoresistive sensors; including: capability of micro power operation, and ability to withstand high temperature environments. See Hannah, R L, and Reed S. E., editors: Strain Gauge User's Handbook, Chapter 7, *High Temperature Strain Gauges* (by G. Twa), page 197, Elsevier Applied Science, Publ., NY, N.Y., 1992. Inductive transducers possess advantages of excellent robustness, moisture resistance, non-contact operation, capability of measurement of large deformations, crack propagation, and gap displacements.

The use of strain gauge rosettes is widespread in the aeronautical, naval, and aerospace industries as a means of mathematical model verification and structural testing. Stress analysis applications typically require the measurement of principal strain magnitude and direction. See Dally & Riley, *Experimental Stress Analysis*, McGraw-Hill, 1978. This is usually accomplished by application of a strain gauge rosette to the structure under test. See Vishay Measurements Group Inc, Micro Measurements Div., *Precision Strain Gauges—Catalog* 500, Raleigh, N.C., January 1993. The ASM module described in this invention can accept up to three true differential or 5 pseudo differential inputs (as it has an on-board multiplexer), therefore it can be interfaced with an off-the-shelf strain rosette.

Embedding in Composite Structures

By placing these components on a flexible polyimide substrate, ASM's may be directly bonded to the surface of a composite structure's main load bearing component. The material's final protective overcoat may be used to embed the ASM network, internal power/communications module, and inductive link within the composite structure.

The small size of our embedded nodes facilitates their application within thick composite structures or in very tight, space critical applications. By changing the relative locations of IC's on the thin (polyimide or laminate) substrate, ASM's may be adapted to the physical limitations posed by an application, and can be as thin as 0.080', which can be embedded in many composite materials.

Structures with a broad variety of capabilities may be developed by embedding sensing networks of strain, crack propagation, acceleration, pressure, magnetic fields, etc. Applications include health monitoring of thick composite structures, bridges, dams, and buildings.

The present invention provides a sensor communication network that can be remotely interrogated and programmed without requiring physical connection to sensors. It includes a remote AC power supply that inductively couples energy to the network. The remote power supply is frequency shift keyed (FSK) to communicate digital data from the power supply to the network. The network has rectification means to convert AC power to DC power. The network has a radio frequency transmitter to remotely communicate digital data from the network. The network has one or more nodes for collection of data from one or more sensors. The nodes include an analog to digital converter, a microprocessor, and a network interface.

The nodes can be capable of performing a fast fourier transform of the sensor data.

Nonvolatile memory can be on the remote network for storage of sensor calibration parameters and other data. The nodes can be capable of measuring physical input from inductive and capacitive sensors. The network can include capability to monitor and store the presence of an alarm condition on the network. The network can include capability to multiplex power to individual sensors located on the network. The network can include the capability to perform auto calibration of the signal conditioning electronics.

The present invention also provides a microprocessor based sensor telemetry system for implantable medical applications. The system includes a remote AC power supply that inductively couples energy to the implanted system. The implanted system has a receiving coil to receive coupled energy from a remote AC power supply, a rectifier to convert coupled AC power to DC power, a radio frequency transmitter to remotely communicate digital data from the implant, means for collection of data from one or more sensors, a microprocessor, and an analog to digital converter to read data from the sensors.

The microprocessor based sensor telemetry system for implantable medical applications can include the generation of error checking information by the microprocessor. The remote power supply can be frequency shift keyed (FSK) to communicate digital data from the power supply to the implanted system.

We claim:

1. A sensor communication system, comprising an interrogator unit, a network of addressable sensing modules (ASMs), and a plurality of sensors, wherein
   a non-contact link between said interrogator unit and said network of ASMs, said non-contact link for powering said network or for communication between said interrogator and said network;
   each ASM of said network of ASMs having a low impedance connection state and a high impedance connection state, wherein data can be transmitted from said ASM only when said ASM is addressed and in said low impedance connection state; and
   at least one sensor of said plurality of sensors connected to each of said ASMs.

2. The system as recited in claim 1, wherein said network of ASM's further comprises a central control unit comprising a first microprocessor.

3. The system as recited in claim 2, wherein said first microprocessor can provide a signal to address one ASM at a time to have a low impedance connection.

4. The system as recited in claim 3, wherein each said ASM is connected to receive multiplexed power, wherein said ASM is powered only when addressed.

5. The system as recited in claim 2, wherein a plurality of sensors is connected to a first ASM, wherein said first ASM comprises a second microprocessor, wherein said second microprocessor provides addressing of each of said plurality of sensors connected to said first ASM.

6. The system as recited in claim 5, wherein said second microprocessor addresses only one of said sensors for low impedance connection to said first ASM at a time.

7. The system as recited in claim 1, wherein each said ASM comprises circuits to provide multiplexing, amplification, A/D conversion, or filtering of output of said sensor.

8. The system as recited in claim 7, wherein said multiplexing, amplification, A/D conversion and filtering circuits are integrated on a single chip.

9. The system as recited in claim 7, wherein said amplification, A/D conversion and filtering functions are programmable.

10. The system as recited in claim 7, wherein said amplification function is programmable to accept either a differential bridge type sensor or a pseudo-differential type sensor.

11. The system as recited in claim 7, wherein each said ASM further comprises a second microprocessor connected to receive digital sensor data and to provide said data on a network interface for transmission to said interrogator unit.

12. The system as recited in claim 11, wherein said second microprocessor is further connected to transmit error correcting data along with said sensor data.

13. The system as recited in claim 1, wherein said communication between said interrogator and said network comprises commands from said interrogator unit.

14. The system as recited in claim 1, wherein said network further comprises a transmitter to transmit data from said sensors, wherein said interrogator unit comprises a receiver to receive said data.

15. The system as recited in claim 14, wherein said transmitter comprises an RF transmitter.

16. The system as recited in claim 1, wherein each said ASM comprises non-volatile memory.

17. The system as recited in claim 1, wherein a first of said sensors is for measuring strain direction, strain magnitude, displacement, pressure, humidity, temperature, inclination, orientation, magnetic field intensity, magnetic field direction, acceleration or crack propagation.

18. The system as recited in claim 1, wherein said sensor comprises a foil strain gauge, strain gauge rosettes, a piezoresistive strain gauge, an inductive sensor, or a capacitive sensor.

19. The system as recited in claim 1, wherein power is provided to said network of ASMs with a battery.

20. The system as recited in claim 1, wherein power is provided to said network of sensors from said interrogator through said non-contacting link.

21. The system as recited in claim 1, wherein said non-contacting link comprises an inductive link.

22. The system as recited in claim 21, further comprising a circuit for modulating an AC waveform to provide both a communication signal and power to said network of sensors from said interrogator.

23. The system as recited in claim 22, wherein said circuit for modulating said AC waveform comprises a frequency shift key.

24. The system as recited in claim 23, wherein said network comprises a PLL for FSK demodulation of said signal from said interrogator.

25. The system as recited in claim 1, wherein said network further comprises a circuit for rectifying received AC power to DC power for powering said network.

26. The system as recited in claim 1, wherein said network comprises a coil/capacitor circuit wherein said interrogator comprises an external powering system that automatically adjusts its excitation frequency to match resonant frequency of said coil/capacitor network.

27. The system as recited in claim 1, wherein said sensor comprises circuitry mounted on flex.

28. The system as recited in claim 1, wherein said sensor comprises a differential capacitive transducer or a differential inductive transducer.

29. The system as recited in claim 1, wherein said interrogator further comprises a computer to facilitate sending data to said network or receiving data from said sensors.

30. The system as recited in claim 1, wherein said sensors are for embedding in a structure or implanting in vivo.

31. The system as recited in claim 30, wherein said implanting in vivo is for implantable medical application.

32. A sensor communication system, comprising an interrogator unit and a sensing module, a non-contact link between said interrogator unit and said sensing module, wherein said sensing module comprises a sensing input channel, a programmable gain amplifier, and an a/d converter, wherein said programmable gain amplifier is connected between said sensing input and said a/d converter.

33. A sensor communication system as recited in claims 32, wherein said programmable gain amplifier can be programmed to accept data either from a differential type sensor or a pseudo-differential type sensor.

34. A sensor communication system as recited in claim 32, wherein said sensing module further comprises a programmable digital filter.

35. A sensor communication system as recited in claim 32, wherein said sensing module comprises an integrated circuit chip integrating said programmable gain amplifier and said a/d converter.

36. A sensor communication system as recited in claim 35, wherein said chip further comprises a multiplexor.

37. A sensor communication system as recited in claim 36, wherein said multiplexor can multiplex power to individual sensors connected to said sensing module.

38. A sensor communication as recited in claim 35, wherein said sensing module further comprises a microprocessor connected to receive digital sensor data from said a/d converter and to provide said data for transmission to said interrogator unit.

39. A sensor communication system as recited in claim 37, wherein said microprocessor is connected to program said chip.

40. A sensor communication system as recited in claim 37, wherein said microprocessor is connected to program sampling parameters.

41. A sensor communication as recited in claim 37, wherein said microprocessor is further connected to transmit error correcting data along with said sensor data.

42. A sensor communication system as recited in claim 32, wherein said non-contact link comprises an inductive link.

43. A sensor communication system as recited in claim 32, wherein said non-contact link comprises an RF communication link between said interrogator unit and said sensing module.

44. A sensor communication system as recited in claim 32, wherein said sensing module is battery powered.

45. A sensor communication system as recited in claim 32, wherein said non-contact link further comprises components to provide power from said interrogator to said sensing module.

46. A sensor communication system as recited in claim 32, further comprising a network of sensors.

47. A sensor communication system as recited in claim 35, wherein said chip further comprises a programmable digital filter.

48. A sensor communication system as recited in claim 35, wherein said chip further comprises programmable sensing channels.

49. A sensor communication system as recited in claim 35, wherein said chip further comprises a programmable digital filter, a multiplexor, and programmable sensing channels.

50. A sensor communication system as recited in claim 49, wherein said chip comprises a signal conditioning a/d converter chip.

51. A sensor communication system as recited in claim 49, wherein said sensing module further comprises a microprocessor connected to receive digital sensor data from said chip and to provide said data for transmission to said interrogator unit.

* * * * *

UNITED STATES PATENT AND TRADEMARK OFFICE
Certificate

Patent No. 6,529,127 B2                                                                                    Patented: March 4, 2003

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Christopher Pruyn Townsend, Shelburne, VT (US); Steven Willard Arms, Williston, VT (US); and Michael J. Hamel, Williston, VT (US).

Signed and Sealed this Twenty-Ninth Day of July 2008.

<div align="right">

DANIEL WU
*Supervisory Patent Examiner*
Art Unit 2612

</div>